United States Patent
Ju et al.

(10) Patent No.: US 6,776,883 B2
(45) Date of Patent: Aug. 17, 2004

(54) PROCESS OF MANUFACTURING A MAGNETIC READ HEAD

(75) Inventors: Kochan Ju, Fremont, CA (US); You Feng Zheng, San Jose, CA (US); Mao-Min Chen, San Jose, CA (US); Cherng-Chyi Han, San Jose, CA (US); Charles Lin, San Jose, CA (US)

(73) Assignee: Headway Technologies, Inc., Milpitas, CA (US)

(*) Notice: Subject to any disclaimer, the term of this patent is extended or adjusted under 35 U.S.C. 154(b) by 67 days.

(21) Appl. No.: 10/100,754

(22) Filed: Mar. 19, 2002

(65) Prior Publication Data

US 2003/0179512 A1 Sep. 25, 2003

(51) Int. Cl.[7] .................................................. B05D 5/12
(52) U.S. Cl. ...................... 204/192.34; 216/13; 216/22; 216/58; 427/123; 427/125; 427/129; 427/130; 427/131; 427/132; 427/259; 427/265; 427/272; 427/282; 427/533
(58) Field of Search ...................... 204/192.34, 192.1; 216/13, 22, 58; 427/533, 123, 125, 129, 130, 131, 132, 259, 265, 272, 282

(56) References Cited

U.S. PATENT DOCUMENTS

| | | | |
|---|---|---|---|
| 4,967,298 A | 10/1990 | Mowry | 360/113 |
| 5,493,467 A | 2/1996 | Cain et al. | 360/113 |
| 5,637,235 A | 6/1997 | Kim et al. | 216/22 |
| 6,188,549 B1 | 2/2001 | Wiitala | 360/320 |
| 6,292,335 B1 | 9/2001 | Gill | 360/324.11 |

OTHER PUBLICATIONS

Patent application 09/993,402 filed Nov. 6, 2001, HT–01–009 to the same Assignee.

Patent application 09/931,155 filed Aug. 17, 2001, HT–01–015 to the same Assignee.

*Primary Examiner*—Bernard Pianalto
(74) *Attorney, Agent, or Firm*—George O. Saile; Stephen B. Ackerman

(57) ABSTRACT

A magnetic read head with reduced side reading characteristics is described. This design combines use of a current channeling layer (CCL) with stabilizing longitudinal bias layers whose magnetization direction is canted relative to that of the free layer easy axis and that of the pinned layer (of the GMR). This provides several advantages: First, the canting of the free layer at the side region results in a reduction of side reading by reducing magnetic sensitivity in that region. Second, the CCL leads to a narrow current flow profile at the side region, therefore producing a narrow track width definition. A process for making this device is described. Said process allows some of the requirements for interface cleaning associated with prior art processes to be relaxed.

17 Claims, 4 Drawing Sheets

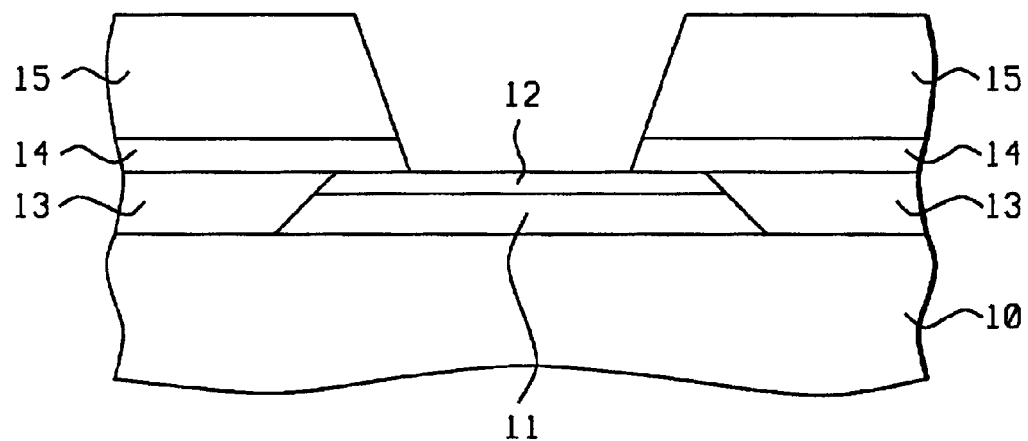
*FIG. 1 − Prior Art*
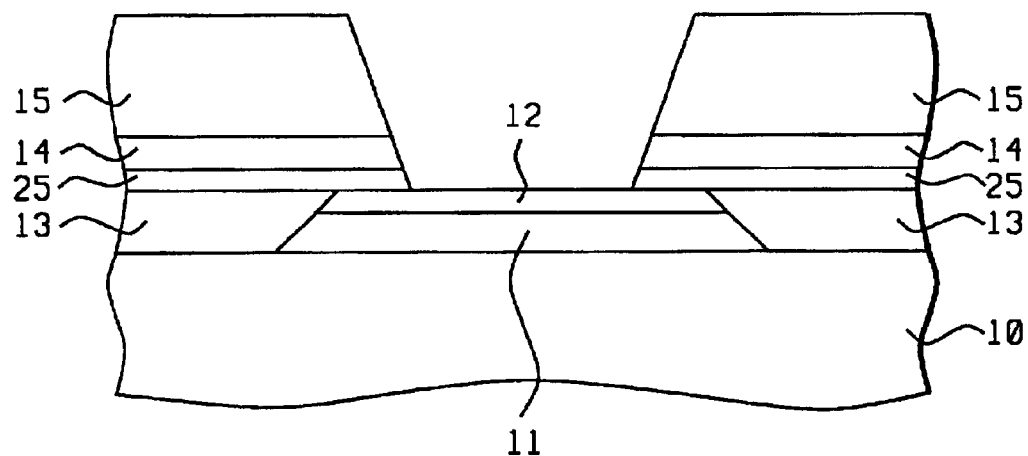
*FIG. 2*

PROCESS OF MANUFACTURING A MAGNETIC READ HEAD

FIELD OF THE INVENTION

The invention relates to the general field of read heads for magnetic disks with particular reference to enhancing narrow track width definition.

BACKGROUND OF THE INVENTION

The read element in a magnetic disk system is a thin slice of material, located between two magnetic shields, whose electrical resistivity changes on exposure to a magnetic field. Magneto-resistance can be significantly increased by means of a structure known as a spin valve (SV). The resulting increase (known as Giant magneto-resistance or GMR) derives from the fact that electrons in a magnetized solid are subject to significantly less scattering by the lattice when their own magnetization vectors (due to spin) are parallel (as opposed to anti-parallel) to the direction of magnetization of the solid as a whole.

The key elements of a spin valve structure are two magnetic layers separated by a non-magnetic layer. The thickness of the non-magnetic layer is chosen so that the magnetic layers are sufficiently far apart for exchange effects to be negligible but are close enough to be within the mean free path of conduction electrons in the material. If the two magnetic layers are magnetized in opposite directions and a current is passed through them along the direction of magnetization, half the electrons in each layer will be subject to increased scattering while half will be unaffected (to a first approximation). Furthermore, only the unaffected electrons will have mean free paths long enough for them to have a high probability of crossing the non magnetic layer. Once these electrons have crossed the non-magnetic layer, they are immediately subject to increased scattering, thereby becoming unlikely to return to their original side, the overall result being a significant increase in the resistance of the entire structure.

In order to make use of the GMR effect, the direction of magnetization of one the layers must be permanently fixed, or pinned. The other layer, by contrast, is a "free layer" whose direction of magnetization can be readily changed by an external field (such as that associated with a bit at the surface of a magnetic disk). Structures in which the pinned layer is at the top are referred to as top spin valves. Similarly, in a bottom spin valve structure the pinned layer is at the bottom.

Shown in FIG. 1, is a schematic cross-section of a lead overlaid spin valve head. Seen there is GMR stack 11 that rests on insulating substrate 10 and is protected by capping layer 12. Although not directly connected to the GMR effect, an important feature of any spin valve structure is a pair of longitudinal bias stripes 13 that are permanently magnetized in a direction parallel to the long dimension of the device. Also seen in FIG. 1 are conductive leads 15 with tantalum underlayer 14. This design is considered to be one of the best candidates for narrow track width reading because of its high signal output and good stability. However, one big drawback is its track width broadening. This poor track width definition is due to the wide spreading current profile from lead to GMR stack, partly due to the high resistivity Ta underlayer 14 in the lead and partly due to the oxidation of Ta in the overlaid region during etching and annealing processes.

In a previously filed application, (Ser. No. 09/993,402 Nov. 6, 2001), it was described how a current channeling layer(CCL) 25 may be inserted between the lead underlay 14 and the GMR stack to minimize current spreading (see FIG. 2). The use of a CCL can effectively reduce the current spread caused by the Ta underlayer, but interface oxidation still remains a problem.

Another previously filed application (Ser. No. 09/931,155 Aug. 17, 2001) disclosed an approach wherein a canted soft adjacent ferromagnetic layer 33 (pinned by an antiferromagnetic layer 34) was used to stabilize the structure, as shown in FIG. 3. In this scheme, the magnetostatic field from soft adjacent ferromagnetic layer (SAL) 33, which is exchange coupled to antiferromagnetic film 34, is used to provide horizontal stabilization to the layer. The magnetization in the SAL is canted toward the transverse direction. The magnetostatic field generated by such a canted SAL layer biases the free layer magnetization in the center region along the horizontal direction while biasing the magnetization in the side region along the transverse direction. This is schematically illustrated in FIG. 6 where free layer 116, pinned layer 117, and seed layer 118 are seen.

The net effect of using a canted SAL is that the side region of the free layer has less flux sensitivity because of its transverse orientation. The requirement of interface cleaning is therefore significantly relaxed compared to the structure shown in FIG. 1. However, due to the high resistivity of AFM layer 13 and Ta underlayer 14, the current spreading is significant. During the actual manufacture of heads, the thickness and canting angle of the SALs may vary, due to processing variations, causing the bias field from the SALs to vary as well. In particular, if the bias field from the SAL is not large enough to pin the magnetization in the wing region, side reading will still occur.

A routine search of the prior art was performed with the following references of interest being found:

In U.S. Pat. No. 5,493,467, Cain et al. show a process for an MR with a canted pinning layer as do U.S. Pat. No. 4,967,298 (Mowry) and U.S. Pat. No. 6,188,495 (Wiitala). U.S. Pat. No. 5,637,235 (Kim et al.) and U.S. Pat. No. 6,292,335 B1 (Gill) are related patents.

SUMMARY OF THE INVENTION

It has been an object of at least one embodiment of the present invention to provide a read head for a magnetic disk system.

Another object of at least one embodiment of the present invention has been that said read head display minimum track width broadening.

Still another object of at least one embodiment of the present invention has been that the free layer portion of the GMR immediately outside the read gap have less flux sensitivity relative to designs of the prior art.

Yet another object of at least one embodiment of the present invention has been to provide a process for manufacturing said read head.

A further object of at least one embodiment of the present invention has been that said process allow some of the requirements for interface cleaning associated with prior art processes, to be relaxed.

These objects have been achieved by combining use of a current channeling layer (CCL) with stabilizing longitudinal bias layers whose magnetization direction is canted relative to that of the free layer easy axis and that of the pinned layer (of the GMR). This design offers several advantages: First, the canting of the free layer at the side region results in the reduction of side reading by reducing magnetic sensitivity in that region. Second, the CCL leads to a narrow current flow profile at the side region, therefore producing a narrow track width definition. A process for making this device is described. Said process allows some of the requirements for interface cleaning associated with prior art processes to be relaxed.

BRIEF DESCRIPTION OF THE DRAWINGS

FIG. 1 shows an example of a lead overlay read head of the prior art.

FIG. 2 shows the structure of FIG. 1 with an added current channeling layer.

DESCRIPTION OF THE PREFERRED EMBODIMENTS

Figure 3:
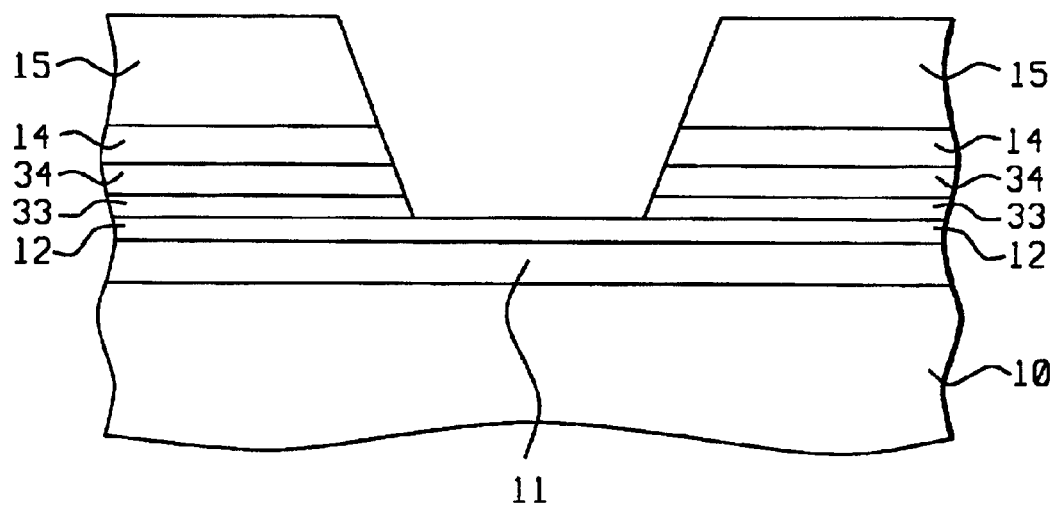
FIG. 3 is FIG. 1 with an added soft adjacent layer and no longitudinal bias stripe.
Figure 4:
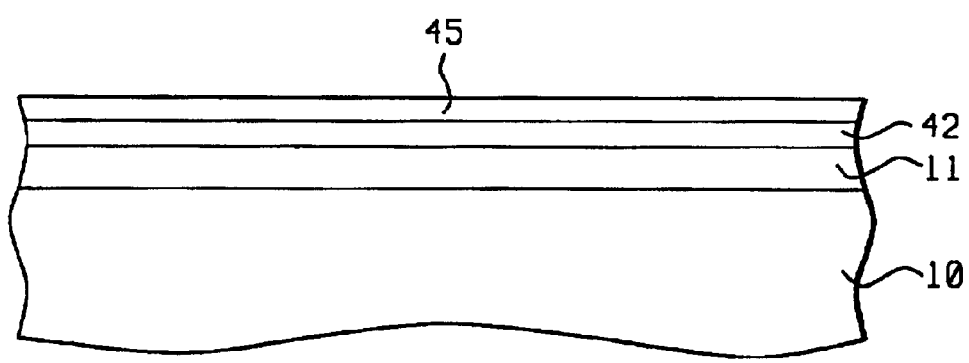
FIG. 4 shows the starting structure for the process of the present invention.

We now describe a process for manufacturing the structure of the present invention. Referring to FIG. 4, the process begins with the provision of a magnetic shield layer (not shown) on which is dielectric layer 10. GMR stack 11 is then formed on layer 10 followed by the deposition of capping layer 42. This capping layer was Ta, or FeTa and it was deposited to a thickness between about 10 and 50 Angstroms. Then, as a first key feature of the invention, current channeling layer 45 is deposited onto capping layer 42. For this current channeling layer we used gold, copper or nickel and it was given a thickness between about 20 and 100 Angstroms. It is important to note here that if inclusion of layer 45 was the only novel feature of the present invention, great care would need to be exercised to ensure that no oxidation of layer 42 occurred prior to the deposition of 45. However, additional features of the invention, that will be described below, allow the conditions of interface cleaning to be considerably more relaxed.

Figure 5:
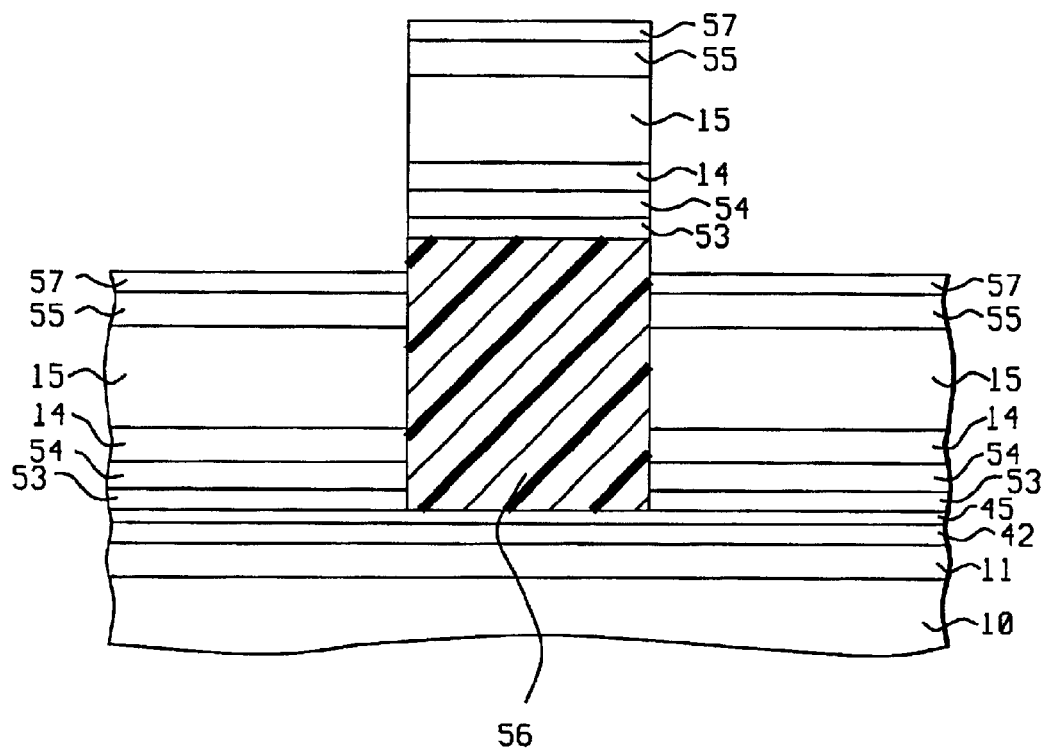
FIG. 5 shows how liftoff is used to form the soft adjacent layers.
Figure 6:
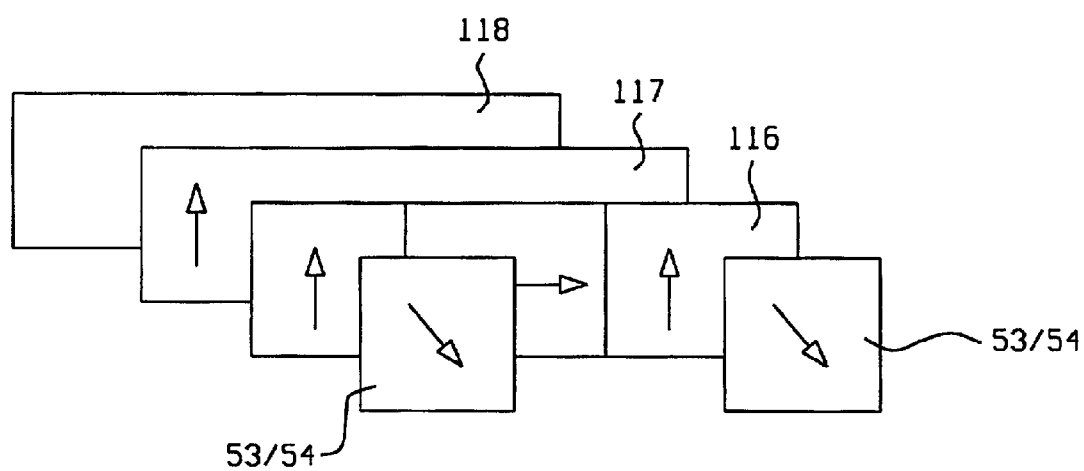
FIG. 6 is a plan view illustrating how the direction of magnetization in the soft adjacent layers is canted relative to the pinned and free layers of the GMR.

Referring now to FIG. 5, pedestal 56 of a light sensitive material is formed on current channeling layer 45 using conventional photolithographic methods. The width of pedestal 56 will determine the width of the read track (between about 0.1 and 0.5 microns) while its height must exceed the total thickness of all layers deposited on it prior to its removal later on.

Next, after using IBE (ion beam etching) to remove surface contaminants from layer 45, soft magnetic layer 53 is deposited to a thickness between about 50 and 100 Angstroms, followed by deposition of antiferromagnetic layer 54. For the soft magnetic layer we used NiFe or CoFe while for the antiferromagnetic layer we used any of PtMn, NiMn, IrMn, or PtPdMn. The structure is then annealed in a magnetic field so as to give soft magnetic layer 53 a magnetization direction that is between that of the GMR's pinned layer that of the easy axis of the free layer (of the GMR), subtending an angle of between about 30 and 70 degrees relative to said easy axis direction. Annealing was performed at a temperature between about 150 and 250° C. for about 10 hours in a magnetic field of between about 100 and 200 oersted. By thus canting the direction of the bias stabilization we also relax the requirements for interface cleaning prior to depositing current channeling layer 45. This is because of the reduction in side reading at the free layer wing region.

The process continues with the deposition, in succession, on antiferromagnetic layer 54, tantalum layer 14, conductive lead layer 15 (typically gold to a thickness between about 150 and 400 Angstroms), and second tantalum layer 55. A second dielectric layer is then deposited to a thickness between about 150 and 500 Angstroms onto upper tantalum layer 55 and pedestal 56 is then selectively removed. This causes all materials that had been deposited onto the pedestal to be lifted off so that soft magnetic layer 53 (and all layers above it) are separated into two opposing halves separated by the designated track width.

Figure 7:
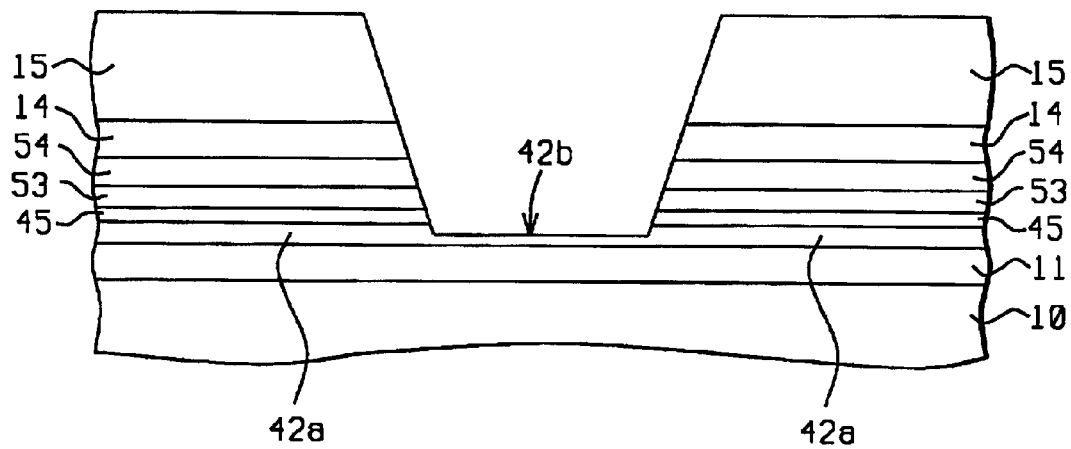
FIG. 7 illustrates the final structure of the process of the present invention.

Finally, as seen in FIG. 7, using dielectric layer 57 as a hard mask, all exposed portions of current channeling layer 45 are removed while at the same time oxidizing any exposed portions of the capping layer. Thus, in FIG. 7, portion 42a remains metallic while portion 42b is converted to its oxide. RIE (reactive ion etching) was used for removing layer 45 and oxidizing part of layer 42.

Figure 8:
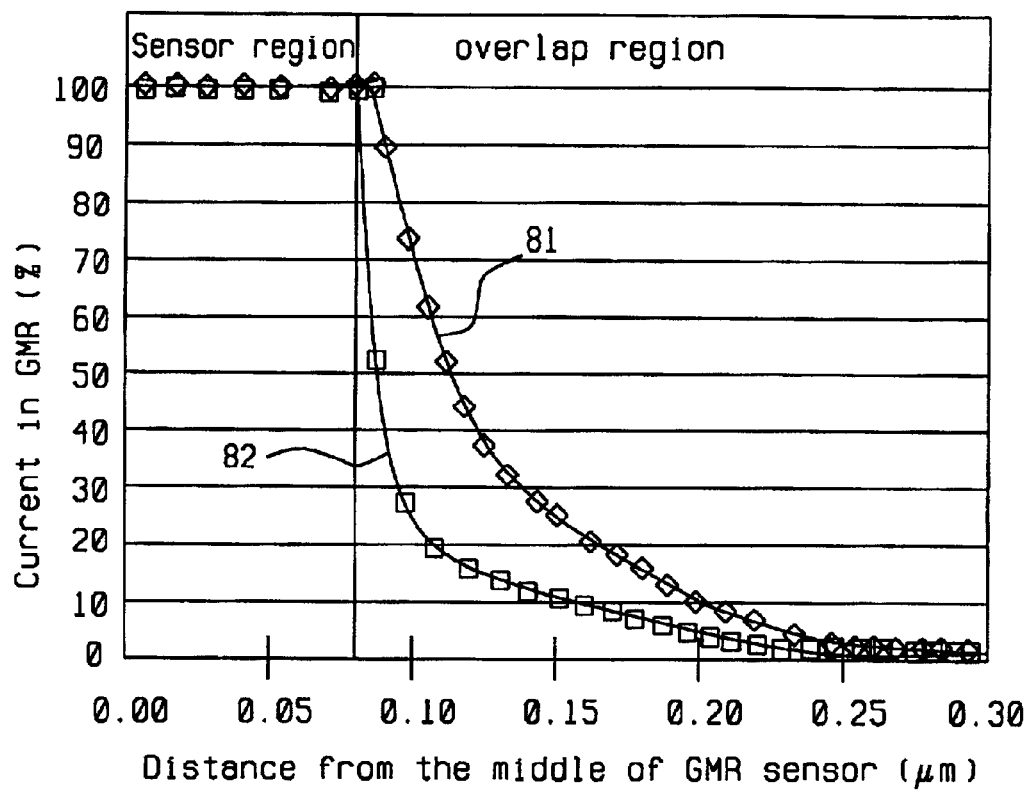
FIG. 8 is a plot of percent current in the GMR as a function of distance from its edge, showing that very little GMR current originates outside the read gap.

FIG. 8 illustrates the effectiveness of layer 45 by plotting the percentage of current passing through the GMR stack as a function of distance from the overlap region. Curve 81 is for a structure without a current channeling layer while curve 82 is with one. As can be seen, for the prior art structure (curve 81) the current is already at about 50% of its value in the GMR at a distance of about 0.12 microns from the edge whereas for curve 82 this level is not reached until about 0.05 microns from the GMR edge.

What is claimed is:

1. A process for manufacturing a magnetic read head having a track width, comprising:

providing a magnetic shield layer and depositing thereon a first dielectric layer;

on said first dielectric layer, depositing a GMR stack that includes a pinned layer that has been magnetized in a first direction and a free layer that has an easy axis in a second direction;

on said GMR stack, depositing a capping layer;

on said capping layer depositing a current channeling layer under conditions of relaxed interface cleaning;

on said current channeling layer, depositing and then patterning a layer of photosensitive material to form a pedestal whose width defines said track width;

on said pedestal and said current channeling layer, depositing a soft magnetic layer;

on said soft magnetic layer, depositing an antiferromagnetic layer and then annealing in a magnetic field whereby said soft magnetic layer has a magnetic moment that is about 2–4 times that of said free layer and is magnetized in a third direction that is between said first and second directions, thereby relaxing requirements for interface cleaning;

on said antiferromagnetic layer, depositing, in succession, a first layer of tantalum, a conductive lead layer, and a second layer of tantalum; on said second layer of tantalum, depositing a second dielectric layer;

then selectively removing said pedestal thereby lifting off all material deposited on said pedestal and forming two opposing soft adjacent layers; and using said second dielectric layer as a hard mask, removing all exposed portions of said current channeling layer and oxidizing any exposed portions of said capping layer.

2. The process described in claim 1 wherein the step of depositing a GMR stack further comprises:

depositing a seed layer;

on said seed layer, depositing a pinning layer;

on said pinning layer, depositing said pinned layer;

on said pinned layer depositing a non-magnetic spacer layer; and on said spacer layer, depositing said free layer.

3. The process described in claim 1 wherein said third direction subtends an angle of between about 30 and 70 degrees relative to said second direction.

4. The process described in claim 1 wherein the step of annealing said stripes in a magnetic field further comprises heating at a temperature between about 150 and 250° C. for about 10 hours in a magnetic field of between about 100 and 200 oersted.

5. The process described in claim 1 wherein said soft magnetic layer is selected from the group consisting of NiFe and CoFe.

6. The process described in claim 1 wherein said soft magnetic layer is deposited to a thickness between about 40 and 100 Angstroms.

7. The process described in claim 1 wherein said antiferromagnetic layer is selected from the group consisting of PtMn, NiMn, IrMn, and PtPdMn.

8. The process described in claim 1 wherein said capping layer is selected from the group consisting of Ta and FeTa.

9. The process described in claim 1 wherein said capping layer is deposited to a thickness between about 10 and 50 Angstroms.

10. The process described in claim 1 wherein said current channeling layer is selected from the group consisting of gold, copper, and nickel.

11. The process described in claim 1 wherein said current channeling layer is deposited to a thickness between about 20 and 100 Angstroms.

12. The process described in claim 1 wherein said conductive lead layer is gold.

13. The process described in claim 1 wherein said conductive lead layer is deposited to a thickness between about 150 and 400 Angstroms.

14. The process described in claim 1 wherein said read head track width is between about 0.05 and 0.5 microns.

15. The process described in claim 1 wherein said second dielectric layer is alumina.

16. The process described in claim 1 wherein said second dielectric layer is deposited to a thickness between about 150 and 500 Angstroms.

17. The process described in claim 1 wherein the step of removing all portions of said current channeling layer further comprises removing said current channeling layer through reactive ion etching followed by oxidizing said capping layer.

* * * * *